United States Patent Office
2,949,779
Patented Aug. 23, 1960

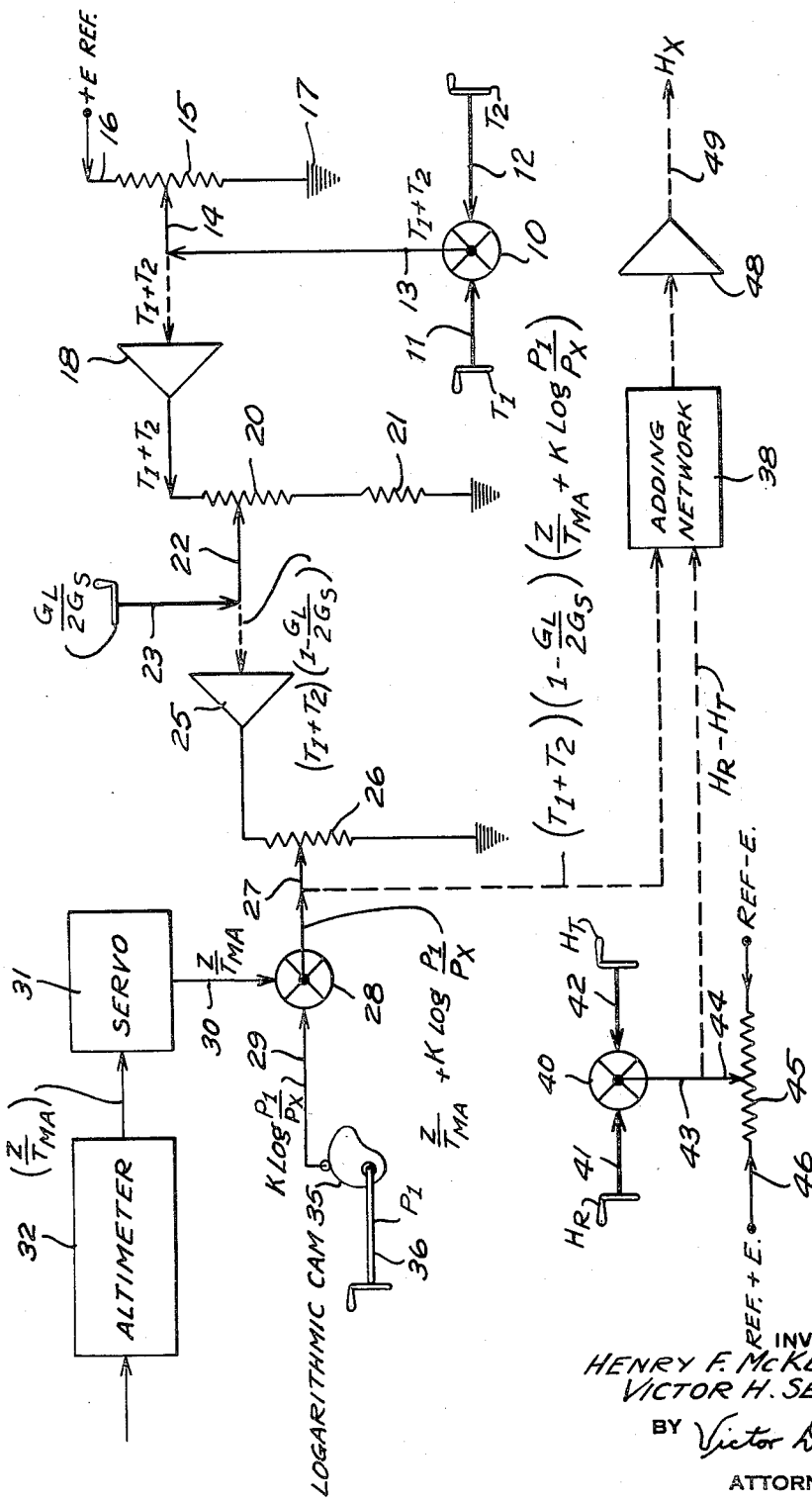

2,949,779

PRECISION ALTIMETER FOR AIRCRAFT

Henry F. McKenney, Valley Stream, and Victor H. Seliger, Forest Hills, N.Y., assignors to Sperry-Rand Corporation, Ford Instrument Company Division, Long Island City, N.Y., a corporation of Delaware Filed Oct. 19, 1955, Ser. No. 541,432

2 Claims. (Cl. 73—384)

This invention relates to altimeters for determining the height of aircraft or the like and has for an object to provide an altimeter system having automatic means for continuously computing the altitude to a high degree of accuracy.

Another object is to provide an altimeter computing system which is suited to correct the altimeter reading in accordance with differences in air temperature on the ground and at the level of the aircraft, with changes in barometric pressure at the ground level and with the gravitational effect.

Another object is to provide an altimeter system which is capable of determining altitude above a predetermined point on the terrain with a high degree of accuracy.

Other objects and advantages will be apparent as the nature of the invention is more fully disclosed.

The most widely used means for determining altitude in aircraft or the like is based on the measurement of the barometric pressure at the altitude in question. Barometric altimeters as commonly used are essentially aneroid barometers with a logarithmic response and with provision for the insertion of the known pressure at a reference point on the terrain. Such altimeters normally indicate directly the elevation above the reference point. Such indication however is only an approximattion because of various factors other than barometric pressure which must be taken into account for accurate determination.

In general therefore precise determinations of altitude require that air temperature, barometric pressure at ground level, and gravitational corrections be applied to the altimeter readings.

It has been found that altitude determinations of a high order of accuracy may be made with a commercially feasible computing system under the following conditions.

A. A ground reference point exists at which barometric pressure and air temperature are measured continuously and from which they can be transmitted to the aircraft.

B. The ground distance of the aircraft from the reference point is not excessive.

C. Normal weather conditions exist.

D. Acceleration due to gravity in the geographical region in question is either accurately known or is known to be negligibly different from a standard value used in the calibration of the altimeter.

For this type of flight an altimeter of the remote indicating type is preferred, having an output which is a logarithmic function of the barometric pressure, and constructed and calibrated to take into account certain constants to be described.

For this type of flight it has been found that by neglecting certain minor factors such as corrections for humidity and gravitational variations within the region, the equation for the height of the aircraft can be expressed as follows:

$$H_X = (T_1 + T_2)\left(1 - \frac{G_L}{2G_S}\right)\left(\frac{Z}{T_{MA}} + K \log \frac{P_1}{P_X}\right) + (H_R - H_T) \quad (1)$$

In this equation $H_X$ equals the height of the aircraft above a selected point on the terrain of known altitude other than the reference point; $T_1$ represents the air temperature at the reference point; $T_2$ represents the air temperature as measured at the aircraft; $G_L$ represents the value of the acceleration due to gravity at sea level in the region in question; $G_S$ represents a standard value of the acceleration due to gravity which is built into the altimeter as a constant and is supplied by the manufacturer of the altimeter; $Z$ is the output of the altimeter which is a single valued function of the barometric pressure according to the equation:

$$Z = K T_{MA} \log_{10} \frac{P_X}{P_2} \quad (2)$$

where $K$ is a constant representing the calibration of the instrument and the computer; $T_{MA}$ is a constant approximating the mean temperature characteristics of a standard atmosphere; $P_X$ is a constant; $K$, $T_{MA}$ and $P_X$ values are supplied by the manufacturers of the altimeter, and are built into the instrument; $P_1$ represents the atmospheric pressure at the reference point; $P_2$ represents the atmospheric pressure at the aircraft; $H_R$ represents the known elevation of the reference point above sea level; $H_T$ represents the known elevation of the selected point in the terrain above sea level.

This equation is suited for mechanization by a mechanical or electrical computer which is directly connected to respond to the output of the altimeter and is adapted to give a direct reading of the height above the selected point.

The drawing is a diagrammatic representation of an electrical computer embodying the present invention and suited to solve the above equation automatically.

Referring to the drawing in more detail, a mechanical differential 10 is provided with inputs 11 and 12 and with an output 13. The inputs 11 and 12 are manually settable in accordance with $T_1$ and $T_2$, respectively, so that the output 13 represents the term $(T_1 + T_2)$ in the above formula. $T_2$ may be set into the computer automatically by a thermometer carried in the aircraft, if desired. The ouput 13 of the differential 10 is connected to position movable contact 14 of a potentiometer 15 supplied at one end with a constant voltage by a lead 16, and with its other end grounded as at 17. Thus the voltage between ground and the contact 14 represent the value $(T_1 + T_2)$.

This voltage at the contact 14 is applied to an isolating amplifier 18 and thence to a potentiometer 20 which is connected to ground through a fixed resistor 21. Movable contact 22 of the potentiometer 20 is actuated by a manual setting means 23 which is settable in accordance with a quantity proportional to $$\left(\frac{G_L}{2G_S}\right)$$

The voltage above ground of the point 22 thus is made to represent the quantity $$(T_1 + T_2)\left(1 - \frac{G_L}{2G_S}\right)$$

This voltage of the point 22 is applied to an isolating amplifier 25 which supplies a voltage proportional to the above terms across a potentiometer 26. The potentiometer 26 is provided with a movable contact 27 which is actuated by the output of a mechanical differential 28 having inputs 29 and 30. The input 30 is actuated by the output of a servo mechanism 31 which is driven in response to the output of an altimeter 32. The altimeter 32 is of the type having an output proportional to $$\left(\frac{Z}{T_{MA}}\right)$$

as above defined.

The input 29 of the differential 28 is driven by a logarithmic cam 35 which is settable manually by means of an input shaft 36 in accordance with the value $P_1$ which is transmitted to the aircraft by radio from the reference point. The cam 35 is so designed that the output represents K log $$\frac{P_1}{P_X}$$

The output of the differential 28 is thus proportional to the term $$\left(\frac{Z}{T_{MA}}\right)+K\log\left(\frac{P_1}{P_X}\right)$$

The output voltage of the contact 27 represents the product of the above factors which according to Equation (1) represents the height of the aircraft above the reference point. This voltage is applied to an adding network 38.

A differential 40 is provided with inputs 41 and 42 which are settable to represent $H_R$ and $H_T$, respectively, and with an output 43 which represents $H_R-H_T$. This output drives movable contact 44 of a potentiometer 45 which is supplied with a constant voltage by a lead 46. The voltage at the contact 44 is applied to the adding network 38, wherein it is added to the voltage derived from the contact 27. The output of the adding network 38 is applied to an amplifier 48, thence to an output lead 49. The voltage in lead 49 thus represents $H_X$, the height of the aircraft above the selected point and may be indicated on a suitable voltmeter having a scale reading directly in feet.

As a specific example, the term Equations (1) and (2) may have the following representative values in a particular apparatus:

$T_1=293°$ K. } as measured by thermometers on the ground
$T_2=245°$ K. } and in the aircraft.

$G_L=982$ } cm. per sec. per sec. as determined from a
$G_S=980.7$ } table and/or by gravitational measurement.

$T_{MA}=270°$ K.
$K=222$
$P_X=29.92$ in. of Hg
} as supplied by the altimeter manufacturer and built into both the instrument and the computer as constants.

$P_1=28.30$
$P_2=14.00$
$H_T=3000$ ft.
$H_R=2000$ ft.

Applying these figures to Equations (1) and (2) it is found that Z=19,768 feet, the output indication of the altimeter, and $H_X$=17,230 feet, the corrected height of the aircraft above the selected point as indicated by the output of the computer.

Although a specific embodiment of mechanized computer has been shown it is to be understood that this embodiment is representative only and that variations and modifications may be made therein, as will be apparent to a person skilled in the art.

What is claimed is:

1. A precision altimeter system for determining the height of an aircraft above a ground point, comprising a first potentiometer having a reference voltage input and a variable output contact, means to position the variable contact in accordance with the sum of the temperature at a reference point and the ambient temperature at the aircraft, a second potentiometer having a variable contact, means to feed the voltage output of the first potentiometer to the second potentiometer, means to position the variable contact of the second potentiometer in accordance with a function of acceleration due to gravity, a third potentiometer having a variable contact, means to feed the voltage output of the second potentiometer to the third potentiometer, an altimeter carried by the aircraft and responsive to the ambient barometric pressure at the aircraft and having an output representing a logarithmic function of the said barometric pressure, means for determining a logarithmic function of the barometric pressure at a reference point, means for combining the output of the altimeter with the said function of the barometric pressure at a reference point, means to position the variable contact of the third potentiometer according to the output of said combining means, a fourth potentiometer having a reference input voltage and a variable contact, means to position the variable contact of the fourth potentiometer in accordance with the difference in elevation of said reference point and that of the ground point, and means to add the voltage outputs of the third and fourth potentiometers.

2. A precision altimeter system for determining the height of an aircraft above a ground point as defined in claim 1, in which the function of acceleration due to gravity is $$\frac{G_L}{2G_S}$$

where $G_L$ represents the value of acceleration due to gravity at sea level in the region of the ground point and $G_S$ represents a standard value of acceleration due to gravity; and the output of the altimeter represents $$\frac{Z}{T_{MA}}$$

where $$Z=KT_{MA}\log_{10}\frac{P_X}{P_2}$$

in which K is a calibration constant, $T_{MA}$ is a constant approximating the mean temperature characteristics of a standard atmosphere, $P_X$ is a constant and $P_2$ represents the atmospheric pressure at the aircraft; and the means for determining the function of the barometric pressure at a reference point is a logarithmic cam the profile of which is designed to generate the value of $$K\log\frac{P_1}{P_X}$$

where $P_1$ represents the atmospheric pressure at the reference point and $P_X$ is a constant.

References Cited in the file of this patent

UNITED STATES PATENTS

| | | |
|---|---|---|
| 2,378,226 | Lee | June 12, 1945 |
| 2,562,186 | Hallman | July 31, 1951 |
| 2,784,501 | Stern et al. | Mar. 12, 1957 |

OTHER REFERENCES

Electronic Instruments (Greenwood et al.), 1948, pages 131–133.

Product Engineering (Wall), September, 1953, pages 134 to 140.

Analog Methods in Computation and Simulation (Soroka), 1954, pages 19, 46 and 51.